(No Model.)
A. M. BAKER.
POWER LIFTER FOR GRAIN DRILL HOES.
No. 361,040. Patented Apr. 12, 1887.
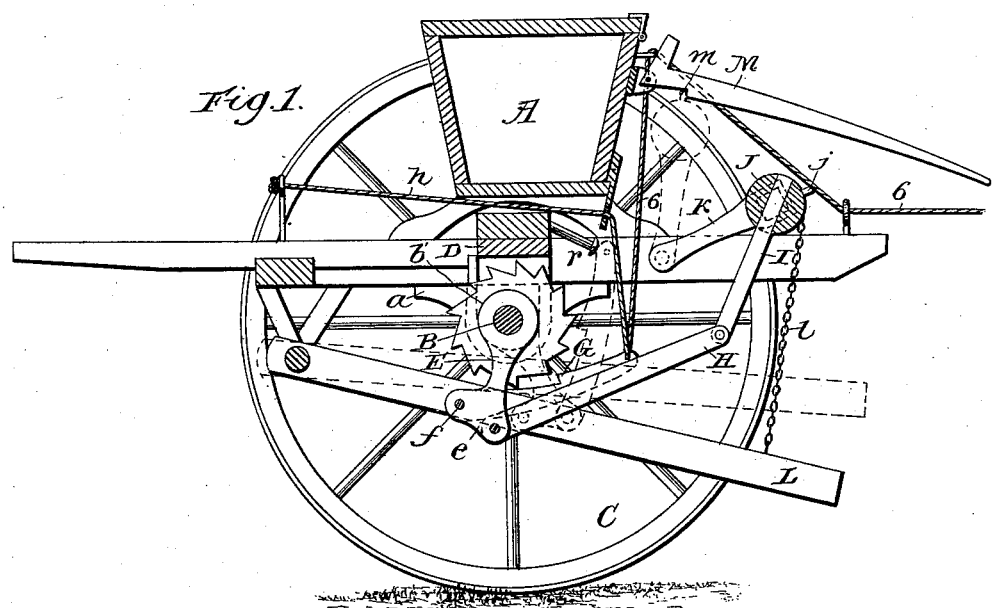
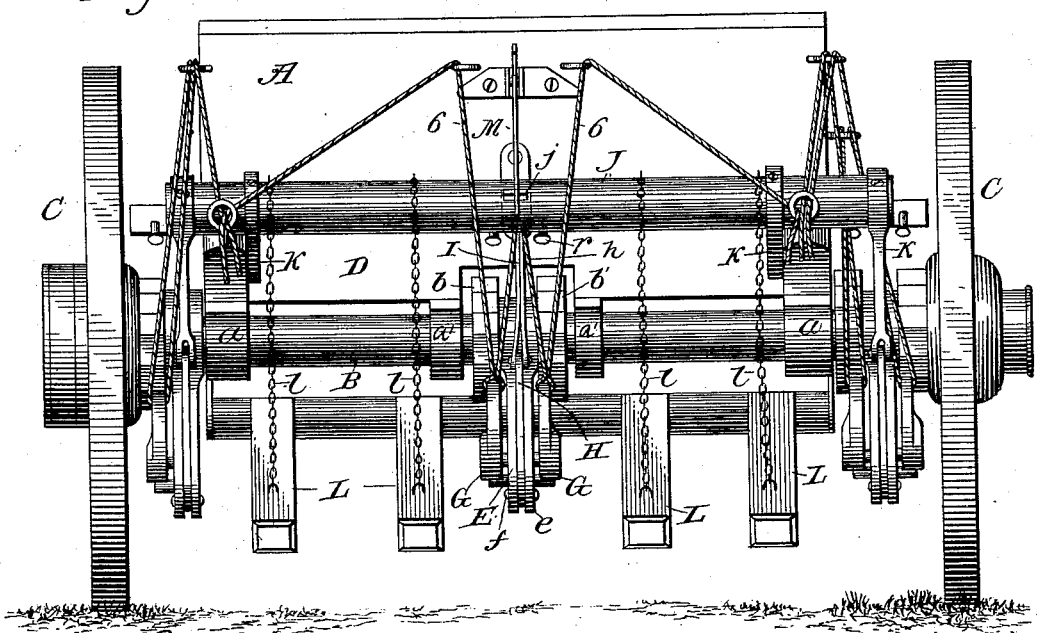
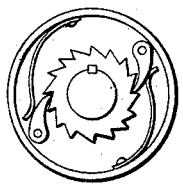
Witnesses: W. H. Bailey, E. W. Smith
Inventor: Archebeld M. Baker

UNITED STATES PATENT OFFICE.

ARCHIBALD M. BAKER, OF BANGOR, BROOKINGS COUNTY, DAKOTA TERRITORY.

POWER-LIFTER FOR GRAIN-DRILL HOES.

SPECIFICATION forming part of Letters Patent No. 361,040, dated April 12, 1887.

Application filed February 12, 1887. Serial No. 227,432. (No model.)

*To all whom it may concern:*

Be it known that I, ARCHIBALD M. BAKER, a citizen of the United States, residing in Bangor township, in the county of Brookings and Territory of Dakota, have invented certain new and useful Improvements in Power-Lifters for Grain-Drill Hoes, of which the following is a description.

My invention relates to seeders and planters; and it consists in the improvements hereinafter described, whereby the driver is enabled to readily raise the hoes either when riding or walking by power exerted from the axle and wheels by the use of one set of gearing, which may be attached in three different places, as shown by the drawings: first, by attaching one ratchet-wheel to the inner end of each hub of the carrying wheels with pawl carriers or casting, which hangs loosely on the axle, with one pawl to each ratchet-wheel, with cords and other fixtures, more accurately described hereinafter, thereby dispensing with a long axle; second, by attaching one ratchet-wheel onto the long axle outside of main frame and one on the inner end of hub of the wheel on the same side of machine with pawl carrier or casting hanging loosely on axle between the two ratchet-wheels, with pawls, cords, and other sections, as hereinafter described; the wheels may turn on the axle independent of each other or be keyed thereto and both revolve together or not, as desired; third, place of attaching is in the center of the axle, as shown by drawings.

The attachment of the cords and the working of the gearing is nearly the same in the first and second places of attaching the gearing as they are in the third, wherein they are described.

By the use of this improvement the driver is enabled to raise the hoes without stopping and while turning, and as readily lower the same when required.

In the accompanying drawings, forming part of this specification, Figure 1 is a longitudinal section of a machine embodying my improvements. Fig. 2 is a rear elevation of said machine, and Fig. 3 is a detail view.

The main frame of the machine may be of any desired construction, and carry the seed-box A, the axle B, which is in two sections, meeting in the center, and the inner ends passing through boxes $a'$ $a'$, which are firmly bolted to the beam D, being also mounted in bearings $a$ $a$ at the ends, so as to turn therein, and carrying at its ends the carrying-wheels C C, which turn therewith independent of each other. The brace-beam D is secured to the main frame immediately above the axle B, and is centrally recessed to permit the rotation of a pair of ratchet-wheels, $b$ $b$, keyed on the inner end of axle B and revolving therewith. Hung loosely on said axle, between the ratchet-wheels $b$ $b$, is a casting, E, a portion of which depends down, where it terminates in a head, $e$, comprising two laterally-extending perforated portions, as shown in Fig. 2. A pin, $f$, in the front perforation of the casting E provides for the pivotal connection of a pawl, G, adapted, when raised, to engage one of the teeth of the ratchet-wheel $b$.

Inasmuch as there are two ratchet-wheels and the casting E is located between them, it will be readily understood that a pawl, G, is hung on a pivot, $f$, at both sides of the casting E, in order to provide a pawl for each ratchet-wheel.

The free end of the pawl G has a cord, $h$, connected thereto, which cord passes through suitable guides to the front of the seed-hopper, at which point it may be connected to a foot-lever. A second cord is also connected to the free end of the pawl and passes vertically upward to and through a guide on the rear of the seed-hopper, and afterward passes rearwardly through a guide on the rear portion of the frame. To the other perforated portion of the head $e$ of the casting E is pivotally attached one end of a bar, H, the other end of which is pivotally connected to the lower end of an arm, I, that depends from a shaft, J, which is rigidly carried by a pair of arms, K K, pivotally attached to the sides of the main frame. The said shaft J is provided centrally with a projection, $j$.

L refers to the drag-bars or hoe-beams, which are pivotally hung at the front of the frame and extending back, and are connected to the shaft J by means of chains $l$. A hand-lever, M, is pivotally hung at the rear of the hopper, and is cut away to form a shoulder. (Designated by $m$.)

In practice, when it is desired to raise the hoes from the position shown in full lines, Fig. 1, it is only necessary to pull on the cords, either from the front or rear of the machine, so as to raise the pawls G so that their lips will be engaged by one of the teeth of the ratchet-wheels, and resulting in the pawls being elevated to swing the head of the casting G rearward, to move the bars H, so that the shaft J will be thrown up to the position shown in dotted lines, Fig. 1, in order that its projection $j$ may engage the shoulder $m$ on the lever M and be locked in such elevated position.

As will be understood, the elevation of the shaft J results in elevating the hoe-beams.

The beam D carries centrally two rearwardly-extending set screws, $r\ r$, which are designed to contact with the upper portions of the pawls when the latter have been sufficiently elevated, so that said pawls will be disengaged by such contact with the ratchet-wheels. By elevating the lever M the shaft J and hoes will drop to their first position.

I claim—

1. The combination, in a seeder and planter, of a main frame, a shaft journaled therein, ratchet-wheel mounted thereon, casting-pawl G, connected thereto, shaft J, and hoe-beams having their rear portions connected thereto, connections between said shaft J and casting E, and cords for operating said pawl to cause it to engage the ratchet-wheel to elevate the shaft J, and devices for locking said shaft in its elevated position, substantially as set forth.

2. The combination, in a seeder or planter, of a main frame, a shaft journaled therein, ratchet-wheel mounted thereon, casting E, pawl G, connected thereto, shaft J, and hoe-beams having their rear portions connected thereto, connections between said shaft and casting, and cords for operating said pawl to cause it to engage the ratchet-wheel to elevate the shaft J, a projection on said shaft J, and pivoted lever M, having a shoulder, $m$, substantially as set forth.

3. The combination, in a seeder and planter constructed and operated substantially as described, of a ratchet-wheel mounted on the main axle and hubs, a pawl, G, and pins $r\ r$, substantially as set forth.

ARCHIBALD M. BAKER.

Witnesses:
CHAS. S. NORTHROP,
F. E. WHEELER.